United States Patent [19]
Whittum et al.

[11] 3,940,549
[45] Feb. 24, 1976

[54] FIRE-RESISTANT RESIN
[75] Inventors: Howard A. Whittum, Worcester; Michael J. Hjelm, Ashby, both of Mass.
[73] Assignee: Advance Coatings Co., Westminster, Mass.
[22] Filed: Mar. 30, 1973
[21] Appl. No.: 346,354

[52] U.S. Cl. ............. 428/500; 106/15 FP; 428/511; 428/484; 428/921
[51] Int. Cl.$^2$ ......................................... B32B 27/30
[58] Field of Search ...... 161/403; 117/137, 161 UB, 117/161 UC, 136; 106/15 FP; 260/28.5 R, DIG. 24, 2.5 FP; 428/921, 511, 484, 485, 500

[56] References Cited
UNITED STATES PATENTS

| | | | |
|---|---|---|---|
| 2,703,776 | 3/1955 | Leader et al. | 117/161 |
| 3,084,068 | 4/1963 | Munn | 117/161 |
| 3,216,852 | 11/1965 | Goldberg | 117/161 |
| 3,284,216 | 11/1966 | Kaplan | 117/137 |
| 3,632,416 | 1/1972 | Shepherd et al. | 117/161 |
| 3,663,463 | 5/1972 | Wren | 260/2.5 FP |
| 3,694,305 | 9/1972 | Munawwar | 161/403 |
| 3,702,785 | 11/1972 | Knechtges et al. | 117/161 |

FOREIGN PATENTS OR APPLICATIONS 1,157,436   7/1969   United Kingdom

*Primary Examiner*—Douglas J. Drummond
*Assistant Examiner*—Michael W. Ball
*Attorney, Agent, or Firm*—Norman S. Blodgett; Gerry A. Blodgett

[57] ABSTRACT

A liquid polymerizable material which may be used, for instance, for the coating of wood or other substrate, which material, when cured, is fire-resistant and protects the substrate. The material cures without application of heat and is formed from methyl methacrylate monomer, a hydroxy alkylacrylate or diacetone acrylamide monomer, a chlorinated hydrocarbon, an antimony compound, a zinc compound, a filler, and a catalyst-promoter system.

13 Claims, 1 Drawing Figure

FIRE-RESISTANT RESIN

BACKGROUND OF THE INVENTION

The potential use of synthetic polymeric materials in the building construction industry has long been recognized. The low cost, ease of handling, and desirable maintenance characteristics, make plastics obvious materials for use in the manufacture of building components such as coatings, panels, and trim. One problem which has held back the progress of polymer compositions in this area is that they are generally quite flammable and, as thin coatings, they provide little fire protection to substrates on which they are laminated. Furthermore, the combustion of organic polymers usually generates billows of malodorous smoke which not only hampers firefighting efforts but also turns even small fires into major problems. Additionally, the "kindling" effect of the burning polymers often elevates the flame temperature, thereby igniting articles which would not have been effected. Another problem is that most polymers cure slowly, require addition of heat to cure, or release dangerous solvents during curing, all of which make manufacture difficult. In the case of prepolymerized materials the mechanical fabrication requires very expensive molds and the like. One of the most desirable types of polymers are polyacrylates. Attempts have been made to reduce the combustibility of these materials by adding "flame-proofing agents" such as chlorinated paraffin wax, tricresyl phosphate and tris (2,3-dichloropropyl) phosphate (see British Patent No. 1,157,436 to Norman Wilkins, 1969). Such a prior art material, as seen in Example 2, has a Flame Spread Rating (F.S.R.) of 100 as determined by the Steiner Tunnel Test (A.S.T.M. E84) (using an equivalent 2 ft. tunnel). An F.S.R. of 25 or below would be far more desirable. These and other difficulties experienced with the prior art compositions have been obviated in a novel manner by the present invention.

It is, therefore, an outstanding object of the invention to provide a liquid polymerizable composition which, after curing, is fire resistant.

A further object is to provide a bulk molding compound from which can be molded fire-resistant articles that will not necessarily be attached to any substrate.

Another object of this invention is the provision of a liquid polymerizable composition from which fire-resistant articles can be fabricated.

A further object of the present invention is the provision of a polymeric composition which can be used as a coating not only to render inexpensive substrates (such as construction-grade plywood) more attractive, but also protect the substrate from both moisture and fire.

It is another object of the instant invention to provide a polymeric composition which is non-burning and self-expanding, thereby forming a thermal barrier when exposed to intense heat.

A still further object of the invention is the provision of a liquid polymerizable composition which is applied to a substrate in liquid form, adhers well, increases in viscosity quickly, and cures at room temperature.

It is a further object of the invention to provide a polymeric composition which gives off little or no smoke when exposed to flame and has little objectionable smell when exposed to flames or when used in manufacturing a product.

A further object of the invention is the provision of a building material that changes from liquid to solid without the release of solvent or other objectionable volatile component.

A still further object is to provide a fire-resistant gel coat on a reinforced fiberglass laminate having load-bearing capabilities, such as building components, boats, car and truck bodies and the like.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In general, this invention involves a liquid polymerizable composition of the acrylate type which is fire resistant and can be used as a coating to protect substrates which are not fire resistant. The composition cures to a hard surface which is wear and moisture resistant, but which is non-burning and self-expanding when exposed to intense heat. These latter properties cause the thin coating to expand into a thick layer of thermal insulation which protects the substrate.

The mixture contains thermoplastic components, a flame-retarding component, a blowing or puffing component, and fillers. More specifically the mixture includes methyl methacrylate monomer, a hydroxy alkylacrylate or diacetone acrylamide monomer, an antimony compound, a zinc compound, a chlorinated hydrocarbon, and a catalyst-promoter system.

BRIEF DESCRIPTION OF THE DRAWING

The character of the invention, however, may be best understood by reference to one of its structural forms, as illustrated by the accompanying drawing, in which is shown a structural panel embodying the principles of the present invention.

DESCRIPTION OF THE PREFERRED EMBODIMENT

Figure 1:
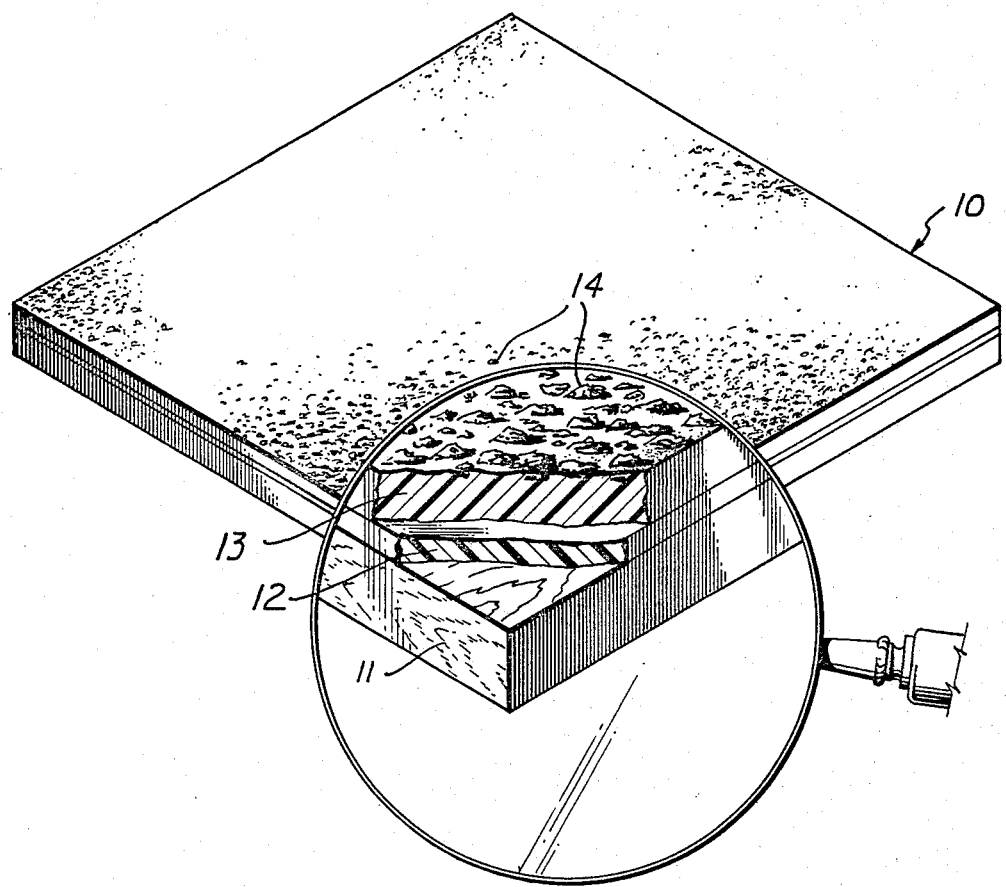

In order to place the characteristic of the composition that will be described in this disclosure in proper perspective, an example of a practical use is shown in the drawing. A wall panel 10 is shown with a magnified cutaway of the layers with which it is fabricated. The base layer or substrate 11 is three-fourths inch construction-grade plywood. To this substrate is applied a thin tiecoat 12 of a polyester resin. This coat seals the plywood and provides a uniform surface for further layers. While the tiecoat is still tacky, the fire-retardant coat 13 is applied. This coat is applied with a thickness of about one-sixteenth inch. In addition, a cosmetic coat 14, which in the preferred embodiment consists of a sprinkling of small stones, can be applied to enhance the appearance of the exposed surface.

The low-cost mass production of articles similar to the one described above requires that the fire-resistant composition have a plurality of desirable characteristics. Obviously, it must be resistant to wear and moisture when cured and be capable of holding a consistant opaque color to hide the grain of the plywood. Additionally, the composition must gel quickly and set to avoid sagging and must also cure to hardness quickly to permit handling. This curing process should take place at room temperature. Also, the various components should desirably be of low volatility and free of noxious odor during both mixing and curing.

Equally important in this case is the reaction of the cured composition to flames and high temperature. Obviously, it must not add to the flames and, in addition, it should protect from high temperature and ignition the substrate which, in this case, is wood. The latter effect is accomplished by self-expansion or puffing of the composition to many times its cure thickness with the resulting creation of a foam-thermal barrier. This property of foaming or puffing with exposure to heat is called intumescence. Also, exposure to intense heat should not cause the composition to give off undesirable smoke or odor.

The invention involves a combination of compounds which, when added to a batch of a suitable monomer, combine synergistically to impart not only desirable curing and physical properties but also fire resistance and intumescence. The character of the invention should be made clear by the following examples. Unless otherwise noted, compositions are expressed in parts by weight. The invention also involves various useful forms of the composition in symbiotic combination with compatable substrates, such as wood, plastic and reinforced plastic composites.

EXAMPLE 1

The first step in the reduction to practice was the preparation of the mixture of monomers and flame-retardant chlorinated organic material. The formula W18-222-1 was as follows:

| | % | g |
|---|---|---|
| Hydroxy propylacrylate monomer (CX-2383, Dow Chemical Company) | 17.95 | 718 |
| Methyl methacrylate monomer (Union Carbide Corp.) | 17.95 | 718 |
| Chlorez 700AX (Dover Chemical Co.) chlorinated paraffin (70% chlorine) | 63.50 | 2540 |
| Super Airout (Isochem Resins Co.) (an air release agent comprising a silane modified product of a silicone reacted with a tallate) | 0.10 | 4 |
| wetting agent | 0.50 | 20 |
| | 100.00 | 4000 |

The ingredients were added, in the order shown to a 1-gallon friction-top can, with mechanical agitation.

The second step was the establishment of a suitable curing system which will give an initial cure at room temperature without application of heat. The following systems were tried:

| | W18-222- | | |
|---|---|---|---|
| | 2 | 3 | 4 |
| W18-222-1 | 100 g. | 100 g. | 100 g. |
| 2,4-Pentanedione (Union Carbide Corp.) | 0.4 | — | — |
| Lupersol PDO (50% t-butyl peroctoate) (Lucidol Division, Pennwalt Corp.) | 2 | — | — |
| Luperco ANS-50 (50% benzoyl peroxide) Lucidol Division, Pennwalt Corp.) | — | 0.70 | 0.70 |
| Cobalt Catalox 12% (Ferro Chemical Division, Ferro Corporation) 12% coblat catalytic paint dryer | 0.4 | — | — |
| N,N-Dimethyl-p-toluidine (Naftone, Inc.) | — | 0.14 | — |
| N,N-Dimethylaniline (American Cyanamide Company) | — | — | 0.14 |

In each experiment, the ingredients were added, in the order shown, to a 6-oz. plastic-coated paper hot-drink cup with hand mixing with a wooden spoon after each addition. The timing for gel time was begun at the time of mixing in of the cobalt or amine promoter. Each cup was allowed to stand at room temperature (about 72°F) without external heating. Experiment W18-222-2 began to gel in 30 minutes; W18-222-3 in 5 to 8 minutes; W18-222-4 in about 20 minutes. Of the three systems tested, the dimethyl-p-toluidinebenzoyl peroxide (W18-222-3) was considered most suitable.

An antimony oxide masterbatch, W18-222-5, was prepared by the addition of 400 g. of Thermogard S (M & T Chemicals, Inc.) to 400 g. of monomer mixture W18-222-1 with mechanical agitation. The Thermogard-monomer mix was passed once through a laboratory hand homogenizer (Scientific Glass Apparatus Co., Inc., 1969 Catalog No. H-2585).

The next step was the preparation of a cast cured panel for evaluation of flame-retardant properties. The formula for this preparation (W18-222-6) was as follows:

| | g |
|---|---|
| W18-222-1 monomer mix | 600 |
| W18-222-5 antimony oxide masterbatch | 76 |
| Industrial ground gypsum (United States Gypsum Co.) | 825 |
| Iron oxide | 15 |
| Luperco ANS-50 (50% benzoyl peroxide) (Lucidol Division, Pennwalt Corp.) | 4.2 |
| N,N-Dimethyl-p-toluidine (Naftone, Inc.) | 0.60 |

The ingredients were added, in the order shown, to a one-quart friction-top can with mechanical agitation. Immediately following the mixing in of the dimethyl-p-toluidine, the mix was poured into a steel mold 22¾ inches long, 3 9/16 inches wide and 1 inch deep, lined with 0.5-mil Mylar film. The mix was smoothed out to form a layer 1/4 inch deep. Gelation occurred without application of heat in 15 to 20 minutes at 80°F. The panel appeared to be well cured after overnight standing, as judged by qualitative surface hardness. After 3 days, the Barcol hardness was 10–20 as determined with the Barcol Impressor (Barber-Colman Co., Model GYZJ 934-1).

The F.S.R. of the cast panel was determined by a modification of the method described in Special Report No. 6090 entitled *Use of a Small Flame Tunnel in the Laboratory Evaluation of Flame Spread Rating*, dated May 5, 1964, prepared by H. L. Vandersall of Monsanto Company. The Flame Tunnel was constructed in accordance with the descriptions on page III-2 and in FIGS. 1 and 2 of the Appendix of the above report and is known as a "Two-Foot Tunnel". It should be noted that this two-foot tunnel setup is generally equivalent to the official 25 ft. tunnel used in the standard Steiner Tunnel Test (A.S.T.M. E 84) (see Example 8). The fuel source for the Type 3-900 Fisher burner flame source was bottled propane gas (suggested as a modification on page V-1 of the above report). The determination of F.S.R. was made in accordance with the procedure described on pages IV-1 through IV-4 of the above report, with the following modifications:

1. Thermocouples for measuring insulative ability were not used.
2. The position of the flame front was recorded every 30 seconds for the first 4 minutes, and every 60 seconds for an additional 6 minutes.

The maximum flame length (average of the three highest values obtained during the first four minutes) was 10 inches; the maximum flame length during the last six minutes was 10½ inches. The F.S.R. was calculated from the above data, together with calibration data obtained with the same equipment and by the same procedure using asbestos and red oak standards. The F.S.R. for the W18-222-6 test panel calculated as described above was 17.5. No afterflaming was observed, and the afterglowing (length of time after all flaming ceases but while red-glowing embers are still visible) was 10 seconds. The char length was 12½ inches. The foam thickness at the point of flame impingement on the panel was about 12 millimeters (original panel thickness about 6 millimeters). The results of the F.S.R. tests show that the composition described is capable of being fabricated into a panel with excellent flame-retardant properties, and that a successful reduction to practice of the invention has been achieved.

EXAMPLE 2

In order to establish a basis of comparative flame resistance, a composition presented in British Patent No. 1,157,436, published on July 9, 1969, and purporting to contain a "flameproofing agent", was set up as a standard in the above-mentioned test.

The material was formed in two syrups as follows:

| SYRUP A | |
|---|---|
| Methyl methacrylate monomer | 70. |
| Methyl methacrylate polymer | 30. |
| Ethylene glycol dimethacrylate | 1.5 |
| Dimethyl-p-toluidine (DMPT) | .5 |
| | 101.9 |
| SYRUP B | |
| Tricresyl phosphate | 30. |
| Tris (2,3-dichloropropyl) phosphate (Fyrol FR-2) | 10. |
| Unichlor 70 AX (Chlorinated Paraffin) | 40. |
| ANS-50 (benzoyl peroxide paste) | 2. |
| | 82. |

The syrups were then combined (230 parts by wt. of Syrup A and 100 parts by wt. of Syrup B) to form a 4 inches × 23 inches laminate with one ply of 1½ oz. glass mat. The material gelled in 15 to 18 minutes and had a F.S.R. of 100+, much higher than that of the composition of Example 1.

EXAMPLE 3

A mixture similar to Example 2 was filled with antimony oxide (a known flame retardant) and hydrated alumina.

| Syrup A | 300. |
|---|---|
| Syrup B | 135. |
| KR-LTS antimony oxide (Harshaw) | 21.5 |
| C-31 coarse hydrated alumina (Alcoa) | 500. |
| | 956. |

This composition was cast into a 4 inches × 23 inches sheet, and gelled in 15 to 18 minutes. It had a F.S.R. of 70, much higher than the composition of Example 1.

EXAMPLE 4

The effect of filler addition on the mixture of Example 1 was examined. A base resin, similar to that of Example 1,

| Hydroxy propylacrylate monomer | 18.0 |
|---|---|
| Methyl methacrylate monomer | 27.0 |
| Chlorinated paraffin (70% chlorine) | 55.0 | was mixed with filler to form:

| Base resin | 100. |
|---|---|
| Antimony oxide | 5.5 |
| Zinc oxide | 20.0 |
| Hydrated alumina | 150.0 |
| 50% benzoyl peroxide paste (ANS-50) | 1.0 |
| N,N-Dimethyl-p-toluidine | 0.2 |

The result was a mixture that gelled at 75°F in 5 to 8 minutes, had a Barcol of 40 and a F.S.R. of 25 in a 2' tunnel.

EXAMPLE 5

In order to examine further the effect of inorganic fillers, a basic resin (No. 8248),

| Hydroxy propylacrylate | 18. |
|---|---|
| Methyl methacrylate | 27. |
| Unichlor 70 AX | 55. |
| Emersol 233 (oleic acid) | .5 |
| Super Airout | .1 |
| Hydroquinone | .009 |
| | 100. | was filled with various fillers.

| No. 8248 resin | 600. |
|---|---|
| KR-LTS antimony oxide | 33. |
| No. 17 Zinc oxide | 120. |
| Ground gypsum | 700. |
| ANS-50 BP paste | 6. |
| Dimethyl-p-toluidine (DMPT) | 1.2 |
| | 1460.2 |

This mixture gelled in 8 minutes, and had a F.S.R. of 17.5. It gave off a trace of smoke, had some puff, and had a slight sag.

EXAMPLE 6

| No. 8248 resin | 600. |
|---|---|
| KR-LTS antimony oxide | 33. |
| No. 17 Zinc oxide | 120. |
| Ground bauxite | 600. |
| ANS-50 BP paste | 6. |
| DMPT | 1.2 |
| | 1360.2 |

This mixture gelled in 12 to 13 minutes and had a F.S.R of 25. It gave off more smoke than Example 4 containing hydrated alumina.

EXAMPLE 7

| No. 8248 resin | 600. |
|---|---|
| KR-LTS antimony oxide | 33. |
| No. 17 Zinc oxide | 120. |
| No. 1 terra alba (Purified gypsum from U.S. Gypsum Co.) | 600. |
| ANS-50 BP paste | 6. |
| DMPT | 1.2 |
| | 1360.2 |

This mixture gelled in 10 to 11 minutes with very bad sag (no backing). The F.S.R. was 8.8, and more smoke was generated than Example 1.

EXAMPLE 8

| | |
|---|---|
| No. 8248 resin | 39.50 |
| Vanadium (6% solution) | .08 |
| Manganese Naphthenate (6% solution) | .2 |
| 2,4-Pentanedione | .2 |
| No. 17 Zinc oxide | 7.9 |
| KR-LTS antimony oxide | 2.17 |
| Coarse hydrated alumina | 50. |
| Cumene hydroperoxide | .6 |
| | 100. |

This mixture had a viscosity of 8.000 c.p.s. after 6 minutes and gelled at 15 to 18 minutes, both at 72°C. It had a density of 15.35 lbs./gallon. It was cast onto regular construction-grade plywood and sprinkled before gelation with ¾ inch granite roofing chips. The F.S.R. was 6 and the smoke was undetectable when tested in the 2 foot tunnel. It should be noted that this same material was run in a 25 foot tunnel which is the official setup for the Steiner Tunnel Test (A.S.T.M. E 84), resulting in a F.S.R. of 2.5 and the smoke generated was zero. This slightly better result not only shows the general equivalence of the two setups, but also suggests that the 2 foot tunnel test is somewhat more severe.

EXAMPLE 9

An essentially unfilled mixture consisting of:

| | |
|---|---|
| No. 8248 resin | 100. |
| Van. 6% | .2 |
| Mang. 6% | .5 |
| 2,4-Pentanedione | .5 |
| Cumene hydroperoxide | 1.5 |
| | 102.7 | was formed into a laminate with two plies of 1½ oz. glass mat. The F.S.R. is 100.

EXAMPLE 10

The above mixture was formed with antimony oxide as follows:

| | |
|---|---|
| No. 8248 resin | 400. |
| Van. 6% | .4 |
| Mang. 6% | 1. |
| 2,4-Pentanedione | 2. |
| KR-LTS antimony oxide | 20. |
| Cumene hydroperoxide | 6. |
| | 429.4 | and formed into a laminate with 1½ oz. glass mat. The F.S.R. was 41 which demonstrates the fire-retarding qualities of antimony oxide.

EXAMPLE 11

Following the same line of thought used in Examples 9 and 10, the mixture was filled with hydrated alumina.

| | |
|---|---|
| No. 8248 resin | 600. |
| KR-LTS antimony oxide | 33. |
| No. 17 Zinc oxide | 120. |
| C-31 coarse hydrated alumina | 900. |
| ANS-50 BP paste | 6. |
| DMPT | 1.2 |
| | 1660.2 |

This mixture gelled in 25 minutes. It had a F.S.R. of 8.8, gave off no smoke, and did not sag.

EXAMPLE 12

In this case, terra alba was used as the filler.

| | |
|---|---|
| No. 8248 resin | 600. |
| KR-LTS antimony oxide | 33. |
| No. 17 Zinc oxide | 120. |
| No. 1 terra alba | 500. |
| ANS-50 BP paste | 6. |
| DMPT | .9 |
| | 1259.9 |

The liquid mixture had a density of 14.5 lbs./gallon and gelled in 12 minutes. The F.S.R. was 12, but the material sagged and smoked badly, and smoldered after the flame died.

EXAMPLE 13

In order to encourage cross-linking and thus a more rigid panel, a dimethacrylate was added.

| | |
|---|---|
| No. 8248 resin | 600. |
| KR-LTS antimony oxide | 33. |
| No. 17 Zinc oxide | 120. |
| No. 1 terra alba | 500. |
| Ethylene glycol dimethacrylate | 30. |
| ANS-50 BP paste | 6. |
| DMPT | .9 |
| | 1289.9 |

The more rigid panel gelled in 10 to 12 minutes, had a F.S.R. of 25, had no sag or puff, and generated more smoke than Example 4.

EXAMPLE 14

To make a lightweight panel, glass bubbles were added.

| | |
|---|---|
| No. 8248 resin | 600. |
| KR-LTS antimony oxide | 33. |
| No. 17 Zinc oxide | 120. |
| No. 1 terra alba | 400. |
| 3M Glass bubbles | 60. |
| ANS-50 | 6. |
| DMPT | .9 |
| | 1219.9 |

The liquid had a density of 10.74 lbs./gallon and gelled in 10 to 12 minutes. It had a F.S.R. of 17, slight sag, and generated more smoke than Example 4.

EXAMPLE 15

The mixture of Example 11 was cast onto ¾ inch fire-resistant plywood to a thickness of about one-sixteenth inch. ¼ inch diameter stones were spread on top and the resin was allowed to cure. The F.S.R. was 11½.

EXAMPLE 16

The mixture of Example 13 was cast onto ¾ inch fire-resistant plywood to a thickness of about one-sixteenth inch. ¼ inch diameter stones were spread on top and the resin was allowed to cure. The F.S.R. was 6.

EXAMPLE 17

In this case, ethyl acrylate replaced hydroxy propylacrylate. The resin (25-51-1) was prepared as follows:

| | |
|---|---|
| Ethyl acrylate | 18. |
| Methyl methacrylate | 27. |
| Unichlor 70 AX | 55. |
| Emersol 233 | .5 |
| Super Airout | .1 |
| | 100. |

A mixture analogous to that of Example 11 was formed.

| | |
|---|---|
| 25-51-1 resin | 39.5 |
| Van. 6% | .08 |
| Mang. Nap. 6% | .2 |
| 2,4-Pentanedione | .2 |
| No. 17 Zinc oxide | 7.9 |
| KR-LTS antimony oxide | 2.17 |
| C-31 coarse hydrate alumina | 50.0 |
| | 100. |

This material had a F.S.R. of 25, and cured very slowly, gelling after 30 minutes. It also had a relatively low heat distortion temperature.

EXAMPLE 18

In this case, the hydroxy propylacrylate of Example 11 was replaced by normal-butyl acrylate,

| | 21-51-2 |
|---|---|
| N-Butyl acrylate | 18. |
| Methyl methacrylate | 27. |
| Unichlor 70 AX | 55. |
| Emersol 233 | .5 |
| Super Airout | .1 |
| | 100. |
| 25-51-2 resin | 39.5 |
| Van. 6% | .08 |
| Mang. Nap. 6% | .2 |
| 2,4-Pentanedione | .2 |
| No. 17 Zinc oxide | 7.9 |
| KR-LTS antimony oxide | 2.17 |
| C-31 coarse hydrated alumina | 50.0 |
| | 100. |

As with Example 17, the cure of this mixture was very slow, with gel occuring after 25 minutes. The F.S.R. was 25 and heat distortion temperature was very low.

EXAMPLE 19

Here, ethyl acrylate was substituted for the methyl methacrylate. The F.S.R. was 30.

| Resin No. 7670 | | Wt.% |
|---|---|---|
| Ethyl acrylate | 24.75 | 19.92 |
| Hydroxy propylacrylate | 24.87 | 20.02 |
| Chlorez 70 AX (chlorinated hydrocarbon paraffin) | 74.63 | 60.06 |
| | 124.25 | 100. |
| No. 7670 resin | 250 | 42.7 |
| Antimony oxide grind 50% | 30 | 5.1 |
| Ground gypsum | 305 | 52.2 |
| | 585 | 100. |

EXAMPLE 20

In another attempt without methyl methacrylate, the mixture below was cured with 0.66% t-butyl peroctoate, had a F.S.R. of 20 and gave off no smoke.

| | | |
|---|---|---|
| Hydroxy propylacrylate | 200. | 19.42 |
| Chlorowax 70 | 300. | 29.14 |
| Therm. S (antimony oxide) | 30. | 2.91 |
| Ground gypsum | 500. | 48.53 |
| | 1030. | 100. |

EXAMPLE 21

In this experiment, a composition is prepared with a high concentration of chlorinated hydrocarbon. The mixture gelled in 15 to 20 minutes and had a F.S.R. of 20.5. It burned with a trace of smoke and some odor.

| No. 7747 Resin | | |
|---|---|---|
| Hydroxy propylacrylate | | 17.95 |
| Methyl methacrylate | | 17.95 |
| Chlorez 70 AX (chlorinated hydrocarbon) | | 63.50 |
| Super Airout | | .10 |
| wetting agent | | .50 |
| | | 100. |
| No. 7747 resin | 600 | 39.85 |
| Antimony oxide grind 50% | 76 | 5.05 |
| Ground gypsum | 825 | 54.80 |
| DMPT | .6 | .04 |
| ANS-50 | 4.2 | .28 |
| | 1505.8 | 100.02 |

EXAMPLE 22

Conversely to Example 21, the amount of chlorinated hydrocarbon was reduced to zero. The surface cured very poorly, remaining tacky for a long period. The F.S.R. was 25, but a bad sag was noted. The burning produced sparks, but no smoke, little char and almost no odor.

| | | Wt.% |
|---|---|---|
| Hydroxy Propylacrylate | 200. | 13.08 |
| Methyl methacrylate | 300. | 19.62 |
| C-31 coarse | 1000. | 65.40 |
| Oncor 75RA (N L Industries, Inc.) (an antimony trioxide based fire retardant) | 15. | .98 |
| Cadox 40-E 40% Benzoyl Peroxide in dibutyl phthalate | 12.5 | .81 |
| DMPT | 2. | .13 |
| | 1529.5 | 100.02 |

EXAMPLE 23

In a slightly different mixture, made without chlorinated hydrocarbon, the material gelled in 15 to 18 minutes and cured with a hard surface. The F.S.R. was 25, producing no smoke but many sparks.

| | | Wt. % |
|---|---|---|
| Methyl methacrylate | 225. | 24.46 |
| Hydroxy propylacrylate | 75. | 8.15 |
| E/G dimethacrylate | 6. | .65 |
| C-31 coarse | 600. | 65.2 |
| Aerosil | 7. | .76 |
| ANS-50 | 6. | .65 |
| DMPT | 1.2 | .13 |
| | 920.2 | 100. |

EXAMPLE 24

A mixture was prepared without hydroxy propylacrylate. The material poured well, had a F.S.R. of 60 and flaked off of substrate during flame test.

|  |  | Wt.% |
|---|---|---|
| Methyl methacrylate | 200. | 19.265 |
| Unichlor 70 AX | 200. | 19.265 |
| E/G dimethacrylate | 20. | 1.926 |
| KR-LTS | 10. | .964 |
| C-31 coarse | 600. | 57.80 |
| Cadox 40-E | 7. | .675 |
| DMPT | 1.6 | .015 |
|  | 1038.6 | 99.910 |

EXAMPLE 25

In developing the role of hydroxy propylacrylate in flame-retardance, this mixture was prepared with a lower than normal concentration of the hydroxy propylacrylate. The material gelled in 8 minutes and cured well. It had a F.S.R. of 30, no sag and good puff.

| Methyl methacrylate | 70. | 13.38 |
|---|---|---|
| Chlorowax | 130. | 24.85 |
| Hydroxy propylacrylate | 8.75 | 1.67 |
| E/G dimethacrylate | 8.75 | 1.67 |
| Oncor 75RA | 12.8 | 2.44 |
| C-31 coarse | 290. | 55.4 |
| Cadox 40-E | 2.62 | .5 |
| DMPT | .28 | .05 |
|  | 523.20 | 99.96 |

EXAMPLE 26

The remaining tests (Examples 26–35) were all carried out with a plywood backing as the substrate. The plywood was pretreated with a tiecoat of polyester. The polyester was allowed to partially cure before the mixtures were applied. Furthermore, these remaining examples were executed as a group with great care taken to eliminate unintended variation in parameters.

A mixture without the stones gelled in 16 to 18 minutes. It had a F.S.R. of 12, good adhesion and protected the wood from charring.

| No. 8248 resin | 600. |
|---|---|
| Van. 6% | 1.2 |
| Mang. 6% | 3.0 |
| 2,4-Pentanedione | 3.0 |
| KR-LTS | 33. |
| C-31 coarse | 762. |
| Cumene hydroperoxide | 9. |
| No. 17 Zinc oxide | 120. |
|  | 1531.2 |

EXAMPLE 27

The above mixture was then made up without antimony oxide. It gelled in 18 to 20 minutes, had a F.S.R. of 25, had good adhesion and protected wood from charring.

| No. 8248 resin | 600. |
|---|---|
| Van. 6% | 1.2 |
| Mang. 6% | 3. |
| 2,4-Pentanedione | 3. |
| No. 17 Zinc oxide | 120. |
| C-31 coarse | 762. |
| Cumene hydroperoxide | 9. |
|  | 1498.2 |

EXAMPLE 28

The antimony oxide was replaced by Firebrake ZB (zinc borate). The resulting mixture gelled in 16 to 18 minutes. It had a F.S.R. of 18, had good adhesion and protected the wood from charring.

| No. 8248 resin | 600. |
|---|---|
| Van. 6% | 1.2 |
| Mang. 6% | 3. |
| 2,4-Pentanedione | 3. |
| No. 17 Zinc oxide | 120. |
| Firebrake ZB | 33. |
| C-31 course | 762. |
| Cumene hydroperoxide | 9. |
|  | 1531.2 |

EXAMPLE 29

A mixture was then prepared without either zinc oxide or antimony oxide. The resulting material gelled in 12 to 14 minutes, had a F.S.R. of 30, had very poor adhesion and allowed wood to become charred.

| No. 8248 resin | 600. |
|---|---|
| Van. 6% | 1.2 |
| Mang. 6% | 3. |
| 2,4-Pentanedione | 3. |
| C-31 coarse | 762. |
| Cumene hydroperoxide | 9. |
|  | 1378.2 |

EXAMPLE 30

The mixture was then prepared with antimony oxide, but no zinc oxide. The gel formed in 30 minutes, and the cured product had a F.S.R. of 25, had good adhesion, and protected the wood. The puff was not as good as Example 26.

| No. 8248 resin | 600. |
|---|---|
| Van. 6% | 1.2 |
| Mang. 6% | 3.0 |
| 2,4-Pentanedione | 3.0 |
| KR-LTS | 33. |
| C-31 coarse | 762. |
| Cumene hydroperoxide | 9. |
|  | 1411.2 |

EXAMPLE 31

A mixture without zinc oxide, but with Firebrake ZB (zinc borate), gelled in 20 to 23 minutes, had a F.S.R. of 18, protected the wood, and had good adhesion.

| No. 8248 resin | 600. |
|---|---|
| Van. 6% | 1.2 |
| Mang. 6% | 3.0 |
| 2,4-Pentanedione | 3.0 |
| Firebrake ZB | 33. |
| C-31 coarse | 762. |
| Cumene hydroperoxide | 9. |
|  | 1411.2 |

EXAMPLE 32

Hydroxy butyl acrylate (HBA) was substituted for the hydroxy propylacrylate. The resulting mixture gelled in 10 to 12 minutes, had a F.S.R. of 9, and had good adhesion. It also had good puff and protected the wood. The uncured monomer was extremely smelly, however. The adhesion to the wood was fair.

| Batch 25-59-2 | |
|---|---|
| MMA | 270 |
| Unichlor | 55 |
| Super Airout | 1 |
| Emersol | 5 |
| Hydroquinone | 0.09 |
| 25-59-2 (MMA/Unichlor) | 246. |
| 24-236-1 HBA | 54. |
| Van. 6% | .6 |
| Mang. 6% | 1.5 |
| 2,4-Pentanedione | 1.5 |
| KR-LTS | 16.5 |
| No. 17 Zinc oxide | 60. |
| C-31 coarse | 381. |
| Cumene hydroperoxide | 4.5 |
| | 765.6 |

EXAMPLE 33

Here the hydroxy propylacrylate was replaced by Cellosolve acrylate (ethylene glycol monoethyl ether acrylate). The uncured mixture gave off a very strong odor and gelled in 10 to 11 minutes. The cured material had a F.S.R. of 12, exhibited very good adhesion to the wood, and protected the wood from char. It also had a good puff and gave off no smoke.

| 25-59-2 (MMA/Unichlor) | 246. |
|---|---|
| Cellosolve acrylate | 54. |
| Van. 6% | .6 |
| Mang. 6% | 1.5 |
| 2,4-Pentanedione | 1.5 |
| KR-LTS | 16.5 |
| No. 17 Zinc oxide | 60. |
| C-31 coarse | 381. |
| Cumene hydroperoxide | 4.5 |
| | 765.6 |

EXAMPLE 34

In this example, the hydroxy propylacrylate was replaced by hydroxy ethylacrylate. The resulting material gelled in 3 to 4 minutes, had a F.S.R. of 15, and protected the wood. It had only fair adhesion.

| Batch 25-59-1 | |
|---|---|
| MMA | 270 |
| HEA | 180 |
| Unichlor | 55 |
| Super Airout | 1 |
| Emersol | 5 |
| Hydroquinone | 0.09 |
| 25-59-1 (18% HEA) | 300. |
| Van. 6% | .6 |
| Mang. 6% | 1.5 |
| 2,4-Pentanedione | 1.5 |
| KR-LTS | 16.5 |
| No. 17 Zinc oxide | 60. |
| C-31 coarse | 381. |
| Cumene hydroperoxide | 4.5 |
| | 765.6 |

EXAMPLE 35

Here, the hydroxy propylacrylate was replaced by diacetone acrylamide. The resulting material gelled in 5 to 6 minutes and had a F.S.R. of 12. It gave a good puff that was only half charred and the adhesion was good.

| 25-59-2 (MMA/Unichlor) | 246. |
|---|---|
| Diacetone acrylamide | 54. |
| Van. 6% | .6 |
| Mang. 6% | 1.5 |
| 2,4-Pentanedione | 1.5 |
| KR-LTS | 16.5 |
| No. 17 Zinc oxide | 60. |
| C-31 coarse | 381. |
| Cumene hydroperoxide | 4.5 |
| | 765.6 |

EXAMPLE 36

In an attempt to discover reasonable replacements for MMA, a batch 25-115-1 was prepared involving styrene, and combined as shown below. A 70 mil. casting of the resulting material was made on mylar, backed up with 2 plies of 1½ oz. glass mat and a rigid polyester resin. The material gelled in 45 minutes and was very slow in cure. The resulting structure had a F.S.R. of 35, no intumescence, slight sag, and medium smoke generation.

| Batch 25-115-1 | |
|---|---|
| Styrene monomer | 270. |
| Hydroxy propylacrylate | 180. |
| Unichlor 70 AX | 550. |
| Super Airout | 1. |
| Emersol 233 | 5. |
| Hydroquinone | 0.09 |
| | 1006. |
| W25-115-1 | 300. |
| Antimony oxide KR-LTS | 16.5 |
| No. 17 Zinc oxide | 60. |
| C-31 coarse hydrated alumina | 381. |
| 6% Vanadium Ten-Cem (Mooney) | 0.6 |
| 6% Manganese Naphthenate (Ferro) | 1.5 |
| 2,4-Pentanedione | 1.5 |
| Cumene hydroperoxide | 4.5 |
| | 765.6 |

EXAMPLE 37

In this experiment, acrylamide was examined in the mixture shown below. The V-pyrol was required to dissolve the acrylamide. A 70 mil. casting was made on mylar film, back with 2 plies of 1½ oz. glass mat and a flame retardant resin from Diamond Shamrock Corp. The material gelled in 3 to 4 minutes but remained soft and cheezy after overnite cure.

The cured structure had a F.S.R. of 30, no intumescence, slight sag and heavy smoke.

| | |
|---|---:|
| Acrylamide | 50. |
| GAF V-pyrol (N-vinyl-2-pyrrolidone) | 115. |
| Unichlor 70 AX | 170. |
| 6% Van. Ten-Cem | 0.6 |
| 6% Mang. Naph. | 1.5 |
| 2,4-pentanedione | 1.5 |
| Antimony oxide KR-LTS | 16.5 |
| No. 17 Zinc oxide | 60. |
| C-31 coarse hydrated alumina | 381. |
| Cumene hydroperoxide | 4.5 |
| | 800.6 |

EXAMPLE 38

The mixture in Example 35 was used as a gel coat and cast on a mold at the thickness of 70 mils. After gelling and partially curing, the gel coat was layed up with a general purpose rigid unsaturated polyester resin reinforced with fiberglass mat giving a laminate of approximately one-eigth inch. After curing, the laminate was tested for fire resistance in the 2 foot tunnel with the flame on the gel coat side. The F.S.R. was 18, with good puff and no smoke.

EXAMPLE 39

The experiment in Example 38 was repeated but this time using a fire-resistant back-up resin claimed to have an F.S.R. of 25. In the fire test on this laminate in the 2 foot tunnel the gel coat side was again exposed to the flame. The results were the same as with the general purpose back-up resin, F.S.R. 18, good puff and no smoke.

EXAMPLE 40

In this experiment Dechlorane Plus (non paraffin) (Hooker Chemical Co.) was substituted for the Unichlor 70-AX chlorinated paraffin in the gel coat from Example 35. The fire-resistant back-up resin was used as in Example 39. The F.S.R. was 35 and there was considerable smoke.

EXAMPLE 41

In this experiment Chlorowax 50 (Diamond Shamrock chlorinated paraffin containing 50% chlorine) was used in place of Unichlor 70-AX in the gel coat from Example 35. The F.S.R was 41 with medium smoke.

EXAMPLE 42

In this experiment Firemaster RBF-1 was used in place of the Unichlor 70-AX in the gel coat from Example 35. RBF-1 is a liquid brominated organic compound of Michigan Chemical Corp. The F.S.R. was 30, there was light smoke, and good adhesion.

EXAMPLE 43

In this experiment Firemaster BP-6 (Michigan Chemical Corp.) was used in place of the Unichlor 70-AX in the gel coat from Example 35. The F.S.R. was 30 and there was heavy white smoke.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A fire-resistant product comprising a flammable substrate and a layer of fire-retardant material bonded to the surface of the substrate, said material resulting from polymerization of a mixture comprising from 4–50 wt.% of a first monomer chosen from the group consisting of hydroxy ethylacrylate, hydroxy propylacrylate, hydroxy butylacrylate, ethylene glycol monoethyl ether acrylate and diacetone acrylamide, from 0–50 wt.% of an alkyl methacrylate monomer, and from 30–70 wt.% of a chlorinated paraffin containing from 40–75 wt.% chlorine and including a heat intumescents substance.

2. A first-resistant product as recited in claim 1, wherein the first monomer is hydroxy propylacrylate.

3. A fire-resistant product as recited in claim 1, wherein an antimony containing material is a component of said mixture.

4. A fire-resistant product as recited in claim 1, wherein ground gypsum, also known as hydrated calcium sulphate, is a component of said mixture.

5. A fire-resistant product as recited in claim 1, wherein hydrated alumina is a component of said mixture.

6. A fire-resistant product as recited in claim 1, wherein ground bauxite is a component of said mixture.

7. A fire-resistant product as recited in claim 1, wherein a peroxide catalyst is a component of said mixture.

8. A fire-resistant product as recited in claim 1, wherein an amine promoter is a component of said mixture.

9. A fire-resistant product as recited in claim 1, wherein said mixture includes a catalyst system comprising a solution containing vanadium, a solution containing manganese, 2,4-pentanedione, and cumene hydroperoxide.

10. A fire-resistant product as recited in claim 3, wherein the antimony containing material is antimony oxide.

11. A fire-resistant product, comprising
   a. a substrate having high strength characteristics, and
   b. a protective layer bonded to the surface of the substrate, the layer being comprised of
      i. a first monomer chosen from the group consisting of hydroxy ethylacrylate, hydroxy propylacrylate, hydroxy butylacrylate, ethylene glycol monoethyl ether acrylate, diacetone acrylamide, and combinations thereof,
      ii. a chlorinated paraffin containing 40–75 wt.% of chlorine,
      iii. a hydrated mineral filler,
      iv. an inorganic flame retardant, and
      v. a catalyst-promoter system to cure the mixture.

12. A fire-resistant product as recited in claim 11, wherein the substrate is a fiberglass reinforced plastic on which the protective layer is bonded as a gel coat and the protective layer includes a second monomer.

13. A fire-resistant product as recited in claim 11, wherein the inorganic flame retardant is a combination of antimony oxide and zinc oxide.

* * * * *